United States Patent Office 3,600,374
Patented Aug. 17, 1971

3,600,374
PHENYL-AZO-NAPHTHOIC ACID AMIDE PIGMENTS CONTAINING A NAPHTHOSTYRIL GROUP
Rudolf Mory, Dornach, Switzerland, assignor to Ciba Limited, Basel, Switzerland
No Drawing. Filed Mar. 1, 1968, Ser. No. 709,828
Claims priority, application Switzerland, Mar. 6, 1967, 3,239/67
Int. Cl. C07c 107/08; C09b 29/20
U.S. Cl. 260—152
9 Claims

ABSTRACT OF THE DISCLOSURE

Monoazo dyestuffs of the formula

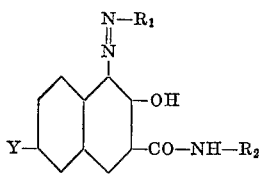

in which Y represents a hydrogen or a halogen atom or an alkoxy or cyano group, $R_2$ represents a naphthostyril radical and $R_1$ represents a benzene radical are valuable pigments which color plastic masses red shades of excellent fastness to light and migration.

---

The present invention is based on the observation that new and valuable monoazo pigments of the formula (1)

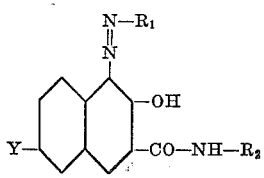

in which Y represents a hydrogen or a halogen atom or an alkoxy or cyano group, $R_2$ represents a naphthostyril residue and $R_1$ represents the residue of a diazotizable amine, especially one of the formula (2)

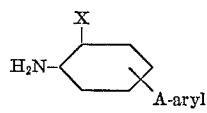

in which X represents a hydrogen or a halogen atom, a low-molecular weight alkyl or alkoxy group, a phenoxy group that may be substituted, a carboxylic acid ester group or a nitro group, A represents a —CONH— group situated in meta- or para-position to the amino group and "aryl" stands for a benzene, naphthalene or para-diphenyl residue that may be substituted, may be obtained by (a) condensing a carboxylic acid halide of the formula (3)

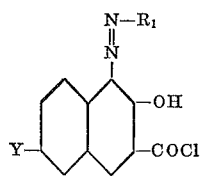

with an aminonaphthostyril, or (b) coupling a diazo compound of an amine of the formula $R_1$—$NH_2$ with a naphthol of the formula (4)

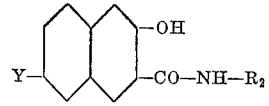

in an aqueous medium, or (c) coupling a diazoamino compound containing the residue $R_1$ with a naphthol of the Formula 4.

The following are given as examples of diazotizable amines of the formula $R_1$—$NH_2$: aniline, and especially halogenated anilines, for example, 2-, 3- or 4-chloroaniline, 3,4-dichloroaniline, 2,3-dichloroaniline, 2,4-dichloroaniline, 2,5 - dichloroaniline, 2,6 - dichloroaniline, 2,4,5-trichloroaniline, 2,4,6-trichloroaniline, 2-, 3- or 4-bromoaniline, 2,4-dibromoaniline, 2,5-dibromoaniline, 2-methyl-5-chloroaniline, 2-methyl-4-chloroaniline, 2-methyl-3-chloroaniline and 2-chloro-5-trifluoromethylaniline; nitroanilines, for example, 2-, 3- and 4-nitroaniline, 4-chloro-2-nitroaniline, 2-chloro-4-nitroaniline, 4-methyl-3-nitroaniline, 2,4-dimethyl-3-nitroaniline, 2-methyl-5-nitroaniline and 2-methyl-4-nitroaniline; alkoxy- and phenoxyanilines, for example, 2- and 4-methoxyaniline, 2- and 4-ethoxyaniline, 3-chloro - 4 - methoxyaniline, 2-methoxy-5-nitroaniline, 2-methoxy-5-chloroaniline, 2-methoxy-5-trifluoromethylaniline, 2-amino-4-trifluoromethyl-4'-chlorodiphenylether, 2-nitro-4-ethoxyaniline, 2-methoxy-4-chloro-5-methylaniline, 2-amino-4-chlorodiphenylether, 2-amino-2,4-dichlorodiphenylether and 2-amino-4,4'-dichlorodiphenylether; 2-amino-5-nitrobenzoic acid methylester, 4-amino-3-nitrobenzotrifluoride, 2-amino-5-nitrobenzotrifluoride, 4-methoxy-3-aminobenzenesulphonic acid-2',5'-dichloroanilide and 4-chloro-3-aminobenzenesulphonic acid-2'-chloro-5'-trifluoromethylanilide.

The following are given as examples of diazotizable amines of the Formula 2: 1-amino-2-chlorobenzene-5-carboxylic acid methylamide, 2,5-dimethoxy-4-benzoylaminoaniline, 2,5 - dimethyl - 4 - benzoylaminoaniline, 2-chloro-5-methoxy-4-benzoylaminoaniline and 2-methoxy-5-methyl-4-benzoylaminoaniline, but especially 4-methyl-3-aminobenzoic acid amide,
4-methyl-3-aminobenzoic acid anilide,
4-methyl-3-aminobenzoic acid-2'-chloro-5'-trifluoromethylanilide,
4-chloro-3-aminobenzoic acid-3',5'-bis-trifluoromethylanilide,
4-chloro-3-aminobenzoic acid-2',4',5'-trichloroanilide,
2,4-dichloro-5-aminobenzoic acid-2',5'-dichloroanilide,
2,4-dichloro-5-aminobenzoic acid-2',4'-dichloroanilide,
2,4-dichloro-5-aminobenzoic acid-3'-trifluoromethylanilide,
2,4-dichloro-5-aminobenzoic acid-3'-chloroanilide,
2,4-dichloro-5-aminobenzoic acid-3'-trifluoro-5-amino-4-methoxy-2-chlorobenzoic acid-3'-trifluoromethylanilide,
4-methyl-3-aminobenzoic acid-2',5'-dichloroanilide,
4-methyl-3-aminobenzoic acid-3'-trifluoromethylanilide,
4-methoxy-3-aminobenzoic acid amide,
4-carbomethoxy-3-aminobenzoic acid anilide,
4-methoxy-3-aminobenzoic acid-3'-chloroanilide,
4-methoxy-3-aminobenzoic acid-2',5'-dichloroanilide,
4-methoxy-3-aminobenzoic acid-2',4',5'-trichloroanilide,
4-carbomethoxy-3-aminobenzoic acid anilide,
4-methoxy-3-aminobenzoic acid-3'-trifluoromethylanilide,
4-carbethoxy-3-aminobenzoic acid-2',5'-dichloroanilide,
4-methoxy-3-aminobenzoic acid-3',5'-bis-trifluoromethylanilide,
4-methoxy-3-aminobenzoic acid-2'-chloro-5'-trifluoromethylanilide, 4-methoxy-3-aminobenzoic acid-2'-5'-dimethoxy-4'-chloroanilide and
4-methoxy-3-aminobenzoic acid-2',5'-dimethyl-4'-chloroanilide.

Since the products of the invention are pigments, they must not contain groups imparting solubility in water, particularly acidic groups imparting solubility in water, for example, sulphonic acid or carboxylic acid groups.

The azo dyestuff carboxylic acids from which the acid halides of the Formula 3 are prepared may be obtained by coupling a diazo compound of an amine of the formula $R_1$—$NH_2$ with a 2,3-hydroxynaphthoic acid of the formula (5) 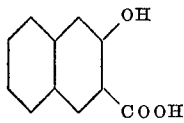

which may be substituted at 6-position with a halogen atom or an alkoxy or cyano group.

The azo dyestuff carboxylic acids obtained are treated with substances which are capable of converting carboxylic acids into their halides, for example, their chlorides or bromides, such substances being, in particular, phosphorus halides, for example, phosphorus pentabromide, phosphorous trichloride or phosphorus pentachloride, phosphorus oxyhalides and preferably thionyl chloride.

The treatment with the said acid halogenating agents is advantageously carried out in an inert organic solvent, for example, dimethylformamide, a chlorobenzene, for example, monochlorobenzene or dichlorobenzene, toluene, xylene or nitrobenzene. If necessary, dimethylformamide may be used in conjunction with the last five solvents specified.

When preparing the carboxylic acid halides, it is generally advantageous first to dry the azo compounds which are prepared in an aqueous medium, or to free them from water by azeotropic distillation in an organic solvent. If desired, azeotropic drying may be carried out immediately prior to the treatment with the acid halogenating agents.

The azo dyestuff carboxylic acid chlorides so obtained are then condensed with an aminonaphthostyril, preferably 4-aminonaphthostyril of the formula (6) 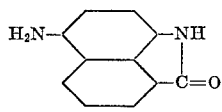

The following are given as examples of substituted and unsubstituted amino naphthostyrils:

4-amino-3-chloronaphthostyrl,
4-amino-2,3-dichloronaphthostyril,
4-amino-2-bromonaphthostyril, 4-amino-5-cyanonaphthostyril, 5-aminonaphthostyril, 5-amino-4-chloronaphthostyril and 5-amino-4-nitronaphthostyril.

Condensation between the carboxylic acid halides of the kind defined above and the aminonaphthostyril according to process (a) of the invention is advantageously carried out in an anhydrous medium. Under these conditions it generally proceeds surprisingly easily, even at temperatures within the boiling range of the common organic solvents, for example, toluene, monochlorobenzene, dichlorobenzene, trichlorobenzene, nitrobenzene and the like. To accelerate the reaction, it is generally advantageous to use an agent capable of binding acid, for example, anhydrous sodium acetate or pyridine. Some of the products obtained are crystalline and some are amorphous and they are generally obtained in a very good yield and in a pure state. It is expedient first to isolate the acid halides obtained from the carboxylic acids. In some cases, however, isolation of the acid halides may be omitted without harm and condensation may be carried out immediately after preparation of the carboxylic acid halides.

In process (b) of the invention the new pigments may be obtained by coupling a diazo compound of an amine of the formula $R_1$—$NH_2$, especially one of the Formula 2, with a 2,3-hydroxynaphthoic acid arylide of the Formula 4.

The 2,3-hydroxynaphthoic acid arylides required for this process may be obtained by a method known per see from a 2,3-hydroxynaphthoic acid which may be substituted in 6-position, and an aminonaphthostyril, particularly 4-aminonaphthostyril in an anhydrous medium, for example, toluene, xylene, chlorobenzene and the like, in the presence of a condensing agent, for example, phosphorus trichloride.

Coupling is effected by gradual addition of the aqueous alkaline solution of the coupling component to the acidic solution of the diazonium salt. The alkali hydroxide used to dissolve the coupling component is advantageously used in an amount such that there is sufficient present to neutralize the mineral acid liberated from the diazonium salt during coupling. Coupling is advantageously carried out at a pH value of 4 to 6. The pH value is advantageously adjusted by the addition of a buffer. Suitable buffers are, for example, the salts, especially the alkali metal salts, of formic acid, phosphoric acid or especially acetic acid. The alkali solution of the coupling component advantageously contains a wetting agent, a dispersing agent or an emulsifying agent, for example, an aralkylsulphonate, for example, a dodecylbenzenesulphonate or the sodium salt of 1,1'-naphthylmethanesulphonic acid, polycondensation products of alkylene oxides, for example, the product obtained by reacting ethylene oxide with paratertiary-octylphenol, and also the alkylesters of sulphoricinoleates, for example, n-butylsulphoricinoleate. The dispersion of the coupling component may also advantageously contain protective colloids, for example, methylcellulose or small amounts of inert organic solvents which are sparingly soluble or insoluble in water, for example, aromatic hydrocarbons which may be halogenated or nitrated, for example, benzene, toluene, xylene, chlorobenzene, dichlorobenzenes or nitrobenzenes as well as aliphatic halogenated hydrocarbons, for example, carbon tetrachloride or trichloroethylene; also suitable are organic solvents miscible with wated, for example, acetone, ethylene glycol monomethylether, methylethylketone, methanol, ethanol or isopropanol.

Coupling may also be carried out advantageously by continuously combining an acidic solution of the diazonium salt with an alkaline solution of the coupling component in a mixing nozzle, during which coupling takes place instantaneously. Care must be taken to ensure that the diazo component and coupling component are present in the mixing nozzle in equimolecular amounts, but it may be advantageous to use small excess of coupling component. The simplest way of doing this is to control the pH value of the liquid in the mixing nozzle. Care must be taken to ensure that the two solutions are in a state of violent turbulence in the mixing nozzle. The pigment dispersion formed is removed continuously from the mixing nozzle and the pigment is isolated by filtration.

In process (c) of the invention the new pigments may be obtained by heating a diazoamino compound containing the residue $R_1$ with a naphthol of the Formula 4 in an organic solvent, if necessary, in an aqueous-organic solvent, preferably in the presence of an acid.

The aryldiazoamino compounds used in accordance with the invention may be obtained according to known processes by condensing an aryldiazonium salt with a primary amino or preferably with a secondary amine. A very wide variety of amines are suitable for this purpose, for example, aliphatic amines, for example, methylamine, ethylamine, ethanolamine, propylamine, butylamine, hexylamine and especially dimethylamine, diethylamine, diethanolamine, methylethanolamine, dipropylamine or dibutylamine; aminoacetic acid, methylaminoacetic acid, butylaminoacetic acid; aminoethanesulphonic acid, methylaminoethanesulphonic acid, guanylethanesulphonic acid and β-aminoethylsulphuric acid; alicyclic amines, for example cyclohexylamine, N-methylcyclohexylamine and dicyclohexylamine; aromatic amines, for example, 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalene-4-sulphonic acid and 1-aminonaphthalene-2, 4 - disulphonic acid; heterocyclic amines, for example, piperidine, morpholine, pyrrolidine and dihydroindole; also sodium cyanamide or dicyanodiamide.

As a rule the diazoamino compounds obtained are sparingly soluble in cold water and, if necessary, may be separated from the reaction medium in a crystalline form by salting out. In many cases, the moist press cake may be used as it is in the further reaction. In some cases it may be advantageous to dry the diazoamino compounds by vacuum drying prior to the reaction or to remove the water by azeotropic distillation after suspension in an organic solvent.

Coupling of the diazoamino compound with the naphthol is carried out in an organic solvent, for example, chlorobenzene, ortho-dichlorobenzene, nitrobenzene, pyridine, ethylene glycol, ethylene glycol monomethylether, ethylene glycol monoethylether, dimethylformamide, formic acid or acetic acid. When using solvents which are miscible with water it is not necessary to use the diazoamino compounds in anhydrous form. For example, the water moist filter cakes may be used. Splitting of the diazoamino compound, which precedes coupling, is carried out in an acid medium. When a neutral solevnt is used it is necessary to add an acid, for example, hydrochloric acid, sulphuric acid, formic acid or acetic acid.

Coupling is advantageously carried out with the application of heat, preferably at a temperature within the range of from 80 to 180° C., and it generally proceeds quickly and completely.

Owing to their insolubility, the pigments obtained may be isolated from the reaction mixture by filtration. Since the by-products remain in solution, the pigments are obtained in a very pure state. Pigments that have been obtained by coupling in an aqueous medium are advantageously subjected to an after-treatment with an organic solvent. The process of the invention has further advantages in that the yields are high, the pigments are obtained in a form suitable for direct use and the properties of the pigments are constant.

By virtue of their advantageous properties, the pigments obtained in accordance with the process of the invention may be used for a very wide variety of purposes; for example, they may be used in a finely divided form for the spin-coloration of filament and staple-fibre viscose, cellulose ethers, cellulose esters, polyamides, polyurethanes and polyesters, and also in the production of coloured lacquers and lake-formers, solutions or products made from cellulose acetate, nitrocellulose, natural or synthetic resins, for example, polymerization resins or condensation resins, for example, aminoplasts, alkyd resins and phenoplasts, and also polyolefines, for example polystyrene, polyethylene and polypropylene, polyvinyl chloride, polyacrylonitrile, rubber, casein, silicones and silicone resins. They may also be used advantageously in the manufacture of coloured pencils, cosmetic preparations and laminated sheet material.

The following examples illustrate the invention. Unless otherwise stated, the parts and percentages are by weight.

EXAMPLE 1

12.6 parts of the dyestuff obtained by coupling diazotized 1 - (3' - amino - 4' - chlorobenzoylamino) - 2,4 - dichlorobenzene with 2,3-hydroxynaphthoic acid are heated for 9 hours at 130 to 140° C. in 100 parts by volume of chlorobenzene with 4.55 parts by volume of thionyl chloride. The dyestuff acid chloride obtained thereby in the form of needles is isolated by filtration after the reaction mixture has cooled, washed with a small amount of benzene and then dried in vacuo at 60 to 70° C. 11.25 parts of the acid chloride are obtained (86.2% of the theoretical yield).

11.2 parts of this acid chloride are heated for 12 hours at 130 to 140° C. in 500 parts by volume of chlorobenzene together with 4.2 parts of 4-aminonaphthostyril and 2 parts by volume of pyridine. The pigment that forms is then isolated from the hot reaction mixture by filtration, washed successively with hot chlorobenzene, cold dimethylformamide, ethanol and water and then dried in vacuo at 60 to 70° C. 12.15 parts (85% of the theoretical yield) of a dark red powder are obtained. The pigment corresponds to the formula

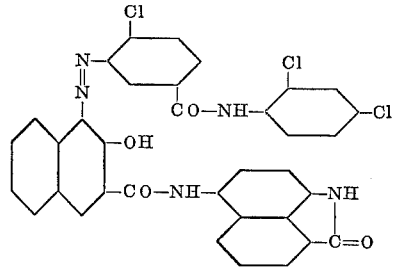

Further pigments may be manufactured in the same manner by using a diazo compound of an amine given in column I in the following table, column II indicates the shade obtained in polyvinyl chloride film with the pigment so produced.

| | I | II |
|---|---|---|
| 1 | 1-(3'-amino-4'-methylbenzoylamino)-2-chloro-5-trifluoromethylbenzene. | Red. |
| 2 | 1-(3'-amino-4'-methylbenzoylamino)-benzene. | Scarlet. |
| 3 | 1-(3'-amino-4'-chlorobenzoylamino)-2-chloro-5-trifluoromethylbenzene. | Red-brown. |
| 4 | 1-(3'-amino-4'methoxybenzoylamino)-3-trifluoromethylbenzene. | Red. |
| 5 | 1-(3'-amino-4'-methoxybenzoylamino)-2-chloro-5-trifluoromethylbenzene. | Claret. |
| 6 | 1-(3'-amino-4'-methoxybenzoylamino)-benzene. | Red. |
| 7 | 1-(3'-amino-4'-chlorobenzoylamino)-benzene. | Red-brown. |
| 8 | 1-(3'-amino-4'-methylbenzoylamino)-3-trifluoromethylbenzene. | Red. |
| 9 | 1-(3'-aminobenzoylamino)-2-chloro-5-trifluoromethylbenzene. | Scarlet. |
| 10 | 1-(3'-amino-4'-chlorobenzoylamino)-3-trifluoromethylbenzene. | Red-brown. |
| 11 | 1-(3'-amino-4'-chlorobenzoylamino)-trichlorobenzene. | Dull red. |
| 12 | 1-(3'-amino-4'-chlorobenzoylamino)-2-trifluoromethyl-4-chlorobenzene. | Red. |
| 13 | 1-amino-2-methoxy-4-nitrobenzene. | Dull violet. |
| 14 | 1-amino-2,5-dichlorobenzene. | Brown. |
| 15 | 1-(3'-amino-4'-methylbenzoylamino)-2-trifluoromethyl-4-chlorobenzene. | Red. |
| 16 | 1-(3'-amino-4'-methoxybenzoylamino)-2,5-dichlorobenzene. | Claret. |
| 17 | 1-(3'-amino-4'-benzoylamino)-2-methylbenzene. | Red. |
| 18 | 1-(3'-amino-4'-chlorobenzoylamino)-2-methoxybenzene. | Dull red. |
| 19 | 1-(3'-amino-4'-methylbenzoylamino)-2-chlorobenzene. | Red. |
| 20 | 1-(3'-amino-4'-methylbenzoylamino)-2-methylbenzene. | Do. |
| 21 | 1-(3'-amino-4'-methoxybenzoylamino)-2-methylbenzene. | Blue-red. |
| 22 | 1-(3'-amino-4'-methoxybenzoylamino)-2-methoxybenzene. | Do. |
| 23 | 1-(3'-amino-4'-methylbenzoylamino)-2,5-dichlorobenzene. | Do. |
| 24 | 1-(3'-amino-4'-chlorobenzoylamino)-2-chlorobenzene. | Red. |
| 25 | 1-amino-2-chloro-5-trifluoromethylbenzene. | Do. |
| 26 | 2,4,5-trichloro-1-aminobenzene. | Khaki. |
| 27 | 2-nitro-4-chloro-1-aminobenzene. | Brown. |
| 28 | 3-amino-4-methylbenzene-1-sulphonic acid monomethylamide. | Red. |

EXAMPLE 2

3.39 parts of 2-aminobenzene-1-carboxylic acid methylester-4-carboxylic acid-(2',5'-dichlorophenyl)-amide are diazotized at 0 to 5° C. for about 30 minutes in a mixture comprising 25 parts by volume of dimethylformamide and 6 parts by volume of 5 N hydrochloric acid with 5 parts by volume of 2 N sodium nitrite. A suspension of the diazo compound is obtained.

3.54 parts of 4-(2',3'-hydroxynaphthoylamino)-naphthostyril are dissolved in 50 parts by volume of dimethylformamide, and then 3.3 parts of anhydrous sodium acetate are added. The diazo suspension is then added within about 15 minutes, and the batch is stirred overnight at room temperature. The pigment is then isolated by filtration and washed with hot water and methanol. After drying, 6.3 parts of the crude product are obtained.

The product is boiled for a short period in nitrobenzene and the pigment is obtained in the form of a soft red powder which may be used as it is for colouring purposes. It produces an intense red shade in polyvinyl chloride film and possesses good fastness to migration. The pigment corresponds to the formula

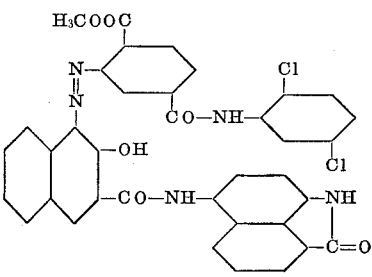

EXAMPLE 3

A mixture is prepared from 65 parts of polyvinyl chloride, 35 parts of dioctyl phthalate and 0.2 part of the pigment obtained in the manner described in Example 1 and then worked to and fro for 7 minutes at 140° C. on a two-roller mill. A red film possessing very good fastness to light and migration is obtained.

I claim:
1. A monoazo pigment of the formula

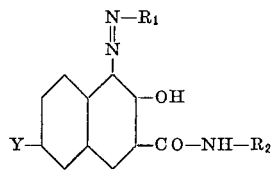

wherein $R_1$ is selected from the group consisting of phenyl, dichlorophenyl, dibromophenyl, trichlorophenyl, tribromophenyl, 2-methyl-chlorophenyl, 2-chloro-trifluoromethylphenyl, nitrophenyl, chloro-nitrophenyl, methyl-nitrophenyl, dimethyl-nitrophenyl, methoxyphenyl, ethoxyphenyl, chloro-methoxyphenyl, methoxynitrophenyl, methoxy-chlorophenyl, methoxy-trifluoromethylphenyl, chlorophenoxy-trifluoromethylphenyl, nitro-ethoxyphenyl, methoxy-chloromethylphenyl, phenoxychlorophenyl, phenoxydichlorophenyl, chlorophenoxychlorophenyl, carbomethoxynitrophenyl, nitrotrifluoromethylphenyl, methoxy(dichlorophenylsulfonamido)phenyl, chloro (chlorotrifluoromethylphenylsulfonamido)phenyl and

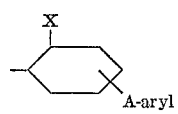

wherein X is selected from the group consisting of hydrogen, chlorine, nitro, carbomethoxy, carboethoxy, lower alkyl and lower alkoxy; A is —CONH— and situated in meta- or para-position to the amino group and aryl is selected from the group consisting of phenyl, chlorophenyl, dichlorophenyl, loweralkylphenyl, loweralkoxyphenyl, trifluoromethyl phenyl and chloro-trifluoromethyl phenyl; Y is selected from the group consisting of hydrogen and cyano; and $R_2$ is naphthostyril.

2. A monoazo pigment as claimed in claim 1 of the formula

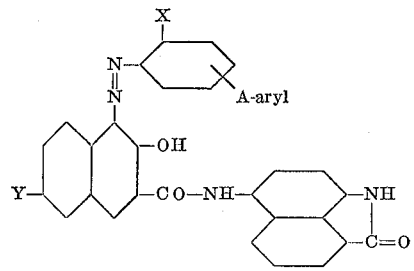

in which X and Y are as defined in claim 1, A represents a —CONH— group situated in meta- or para-position to the amino group and aryl represents phenyl and phenyl substituted by chlorine, lower alkyl, lower alkoxy or trifluoromethyl.

3. A monoazo pigment as claimed in claim 1 of the formula

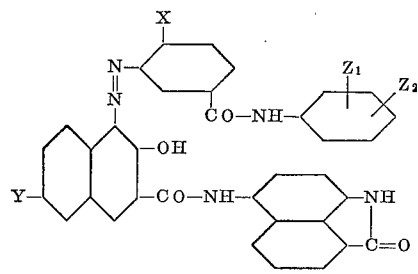

in which $Z_1$ and $Z_2$ are hydrogen, chlorine, lower alkyl, lower alkoxy or trifluoromethyl.

4. The compound as claimed in claim 1 of the formula

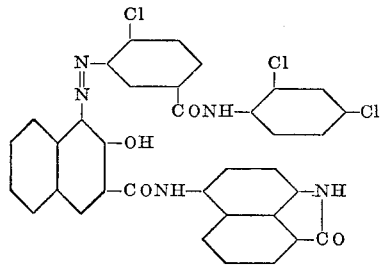

5. The compound as claimed in claim 1 of the formula

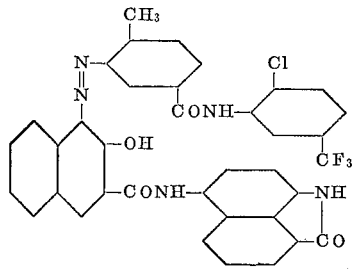

6. The compound as claimed in claim 1 of the formula

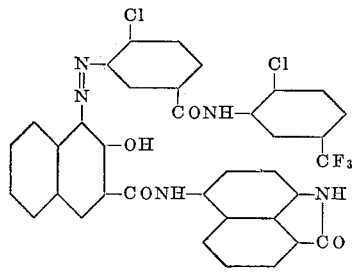

7. The compound as claimed in claim 1 of the formula
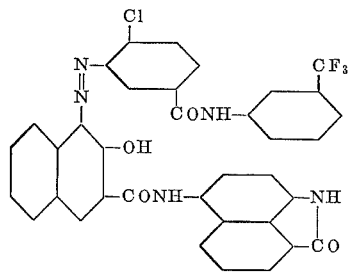
8. The compound as claimed in claim 1 of the formula
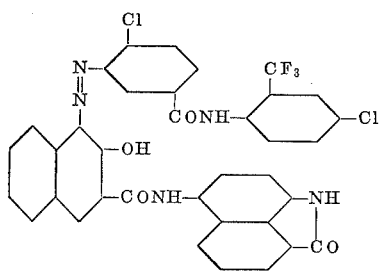
9. The compound as claimed in claim 1 of the formula
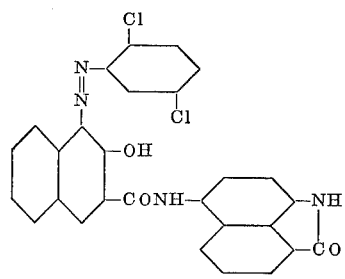
References Cited
UNITED STATES PATENTS
3,386,986   6/1968   Brack _____ 260—152
3,462,408   8/1969   Hoffmann et al. ___ 260—152X
CHARLES B. PARKER, Primary Examiner
C. F. WARREN, Assistant Examiner
U.S. Cl. X.R.
8—4, 41, 50; 106—288; 260—325